(12) United States Patent
Kaemmerer et al.

(10) Patent No.: US 12,377,760 B2
(45) Date of Patent: Aug. 5, 2025

(54) VEHICLE SEAT

(71) Applicant: ADIENT US LLC, Plymouth, MI (US)

(72) Inventors: Joachim Kaemmerer, Kaiserslautern (DE); Christian Wolf, Dielkirchen (DE)

(73) Assignee: Adient US LLC, Plymouth, MI (US)

( * ) Notice: Subject to any disclaimer, the term of this patent is extended or adjusted under 35 U.S.C. 154(b) by 139 days.

(21) Appl. No.: 18/034,484

(22) PCT Filed: Oct. 28, 2021

(86) PCT No.: PCT/IB2021/059965
§ 371 (c)(1),
(2) Date: Apr. 28, 2023

(87) PCT Pub. No.: WO2022/090985
PCT Pub. Date: May 5, 2022

(65) Prior Publication Data
US 2023/0406165 A1   Dec. 21, 2023

(30) Foreign Application Priority Data

Nov. 2, 2020 (DE) .................... 10 2020 128 812.3
Nov. 17, 2020 (DE) .................... 10 2020 130 355.6

(51) Int. Cl.
*B60N 2/12*      (2006.01)
*B60N 2/02*      (2006.01)
*B60N 2/90*      (2018.01)

(52) U.S. Cl.
CPC .......... *B60N 2/12* (2013.01); *B60N 2/02253* (2023.08); *B60N 2002/952* (2018.02)

(58) Field of Classification Search
CPC . B60N 2/12; B60N 2/02253; B60N 2002/952
See application file for complete search history.

(56) References Cited

U.S. PATENT DOCUMENTS 11,912,181 B2 * 2/2024 Uehara ................ B60N 2/1685
2010/0102610 A1 * 4/2010 Shao ........................ B60N 2/12
                                                           297/341

(Continued)

FOREIGN PATENT DOCUMENTS

CN        103502046 A        1/2014
CN        110949203 A        4/2020

(Continued)

OTHER PUBLICATIONS

PCT International Search Report and Written Opinion (PCT/IB2021/059965).

(Continued)

*Primary Examiner* — David R Dunn
(74) *Attorney, Agent, or Firm* — Marshall & Melhorn, LLC

(57) ABSTRACT

A vehicle seat having a seat part, a backrest, a kinematics mechanism for transferring the vehicle seat from a use position to a not-in-use position, and back again, and a locking device to lock the kinematics mechanism in the use position. When the locking device is unlocked, the vehicle seat is transferred out of the use position into an access position and the kinematics mechanism is coupled to a drive device by a coupling device. The coupling device has an unlocking swing arm for at least indirectly unlocking the locking device. When in the use position of the vehicle seat, activation of the drive device first unlocks the swing arm to pivot, so that the locking device is unlocked, and it is only following the pivoting movement of the unlocking swing arm that the kinematics mechanism is driven by the drive device to transfer the vehicle seat into the not-in-use position.

16 Claims, 13 Drawing Sheets

(56) References Cited

U.S. PATENT DOCUMENTS

2019/0152352 A1    5/2019  Handigol et al.
2022/0305958 A1*   9/2022  Hiemstra ........... B60N 2/02246

FOREIGN PATENT DOCUMENTS

| CN | 110979112 A    | 4/2020 |
| DE | 19709852 A1    | 3/1997 |
| DE | 102015205679 A1 | 3/2016 |
| DE | 102019133959 A1 | 3/2021 |

OTHER PUBLICATIONS

China National Intellectual Property Administration, Office Action in Application No. CN2021800740292, dated Apr. 14, 20925, 6 pages, 2025.

\* cited by examiner

VEHICLE SEAT

FIELD

The invention relates to a vehicle seat, in particular a motor-vehicle seat, having a seat part, having a backrest, having a kinematics mechanism for transferring the vehicle seat from a use position, in which the vehicle seat is suitable for transporting people, into a not-in-use position, and back again, and having a locking device, in particular a lock, for locking the kinematics mechanism in the use position, wherein, when the locking device has been unlocked, the vehicle seat can be transferred out of the use position into the access position, wherein the kinematics mechanism, for transferring the vehicle seat out of the use position into the not-in-use position, can be coupled to a drive device by a coupling device.

BACKGROUND

DE 10 2019 133 959 A1 discloses a vehicle seat having a seat part, having a backrest, and having a kinematics mechanism for transferring the vehicle seat from a use position, in which the vehicle seat is suitable for transporting people, into an access position, in particular an access position which facilitates access to a rear row of seats, wherein the vehicle seat can be transferred from the use position into the access position, and vice versa, by a drive device, wherein, for driven transfer of the vehicle seat, the kinematics mechanism of the drive device can be coupled to one another by a coupling device, wherein, for manual transfer of the vehicle seat into the access position, the kinematics mechanism can be uncoupled from the drive device by actuation of the coupling device. The coupling device has a coupling means, which is mounted such that it can be pivoted about an axis of rotation. The coupling means has a catch, which can be operatively connected to the bolt, and an unlocking lever, which interacts with the coupling means. If actuation of the unlocking lever causes the coupling means to be unlocked, the catch is opened, so that the bolt can exit from the coupling means.

SUMMARY

The problem addressed by the invention is that of improving a vehicle seat of the type mentioned in the introduction, in particular of providing a vehicle seat, for which at least one lock which locks a kinematics mechanism can be opened by the drive device.

This problem is solved according to the invention by a vehicle seat, in particular a motor-vehicle seat, having a seat part, having a backrest, having a kinematics mechanism for transferring the vehicle seat from a use position, in which the vehicle seat is suitable for transporting people, into a not-in-use position, and back again, and having a locking device, in particular a lock, for locking the kinematics mechanism in the use position, wherein, when the locking device has been unlocked, the vehicle seat can be transferred out of the use position into the access position, wherein the kinematics mechanism, for transferring the vehicle seat out of the use position into the not-in-use position, can be coupled to a drive device by a coupling device. The coupling device has an unlocking swing arm for at least indirectly unlocking the locking device, wherein, in the use position of the vehicle seat, activation of the drive device first of all causes the unlocking swing arm to pivot, so that the locking device is unlocked. It is only following the pivoting movement of the unlocking swing arm that the kinematics mechanism can be driven by the drive device for the purpose of transferring the vehicle seat into the not-in-use position. Since the coupling device has an unlocking swing arm for at least indirectly unlocking the locking device, wherein, in the use position of the vehicle seat, activation of the drive device first of all causes the unlocking swing arm to pivot, so that the locking device is unlocked, and it is only following the pivoting movement of the unlocking swing arm that the kinematics mechanism can be driven by the drive device for the purpose of transferring the vehicle seat into the not-in-use position, there is no need for any additional actuator for the purpose of unlocking the locking device.

The not-in-use position is, in particular, an access position, which facilitates access to a rear row of seats and is often also referred to as an easy-entry position. In the access position, it is preferably the case that parts of the vehicle seat, in particular the backrest and the seat part, have been pivoted forward, in order to facilitate access to a rear row of seats. It is also possible here for the vehicle seat to have a longitudinal adjuster, which has at least two seat rails and can be unlocked in order for the access position to be assumed, so that the vehicle seat is additionally capable of being pushed forward.

The vehicle seat can be one part, which provides at least one seating position, within a multi-part seat bench. The vehicle seat can be an undivided seat bench.

The seat part can be connected at least indirectly to a vehicle structure. The vehicle seat can be connected to at least one seat rail of a longitudinal adjuster. The longitudinal adjuster can have a seat rail and a floor rail, which can be displaced relatively to the seat rail, it being possible for the two rails to be locked to one another in order for a longitudinal seat position to be adjusted. The longitudinal adjuster can be a motor-drivable longitudinal adjuster. The longitudinal adjuster can be unlocked for manual transfer of the vehicle seat into the access position. An unlocking operation of the longitudinal adjuster can be coupled to actuation of the coupling device, so that the longitudinal adjuster unlocks when the coupling device has been uncoupled from the drive device.

The drive device can have an electric motor. The drive device can have a transmission.

The coupling device can have a coupling member, which can be driven by the drive device, a coupling device, which is connected to a component of the kinematics mechanism, in particular a swing arm of the kinematics mechanism, and also a catch for locking the coupling member to the coupling device. The locking takes place in at least one direction. The catch preferably locks the coupling member to the coupling device in a direction which corresponds to the not-in-use position of the vehicle seat.

The coupling device can be designed in the form of a catch-support device, on which the catch is mounted in a pivotable manner. The unlocking swing arm is preferably mounted in a pivotable manner on the coupling device.

The coupling member can have a mating element. The mating element can be a bolt. The mating element can be a clip. The mating element can be a curved wire. The coupling device can have a mount for receiving the mating element. The unlocking swing arm preferably crosses over the mount. The unlocking swing arm can be pivoted by a movement of the mating element within the mount. The unlocking swing arm can be operatively connected to the locking device by a Bowden cable. A pivoting movement of the unlocking swing arm can be passed on to the locking device by a Bowden cable for the purpose of opening the locking device.

The mount can be in the form of a slot. An open end of the slot can be closable by the catch such that the mating element cannot exit from the mount. The mount can have an end region. The end region can be arranged at an end of the mount which is directed away from an open end of the mount. For the purpose of transferring the vehicle seat out of the use position into the access position, it is the case that, once the locking device has been unlocked, the drive device can pivot the mating element toward the end region, so that, as the operation progresses, the mating element drives the coupling device and therefore the kinematics mechanism.

The catch is preferably in the form of a bracing catch. A bracing catch can be locked to a mating element outside the self-locking region. The bracing catch preferably has a bracing curve for interacting with a mating element, in particular with a bolt or a clip, wherein a gradient of the bracing curve is selected such that there is no self-locking region present, but, under normal loading of the vehicle seat, the opening torque exerted on the bracing catch is smaller than a torque which is in the opposing direction to said torque and is generated by a prestressed spring, which forces the bracing catch in a closing direction.

At least in the use position of the vehicle seat, the mating element can be arranged within the mount, between the unlocking swing arm and the catch. A movement of the mating element within the mount in the direction of the end region of the mount preferably results first of all in contact with the unlocking swing arm and pivoting of the unlocking swing arm, before the mating element comes into contact with the end region.

A movement of the mating element within the mount within the direction of the catch preferably results in contact with the catch. The catch prevents, during a normal operation of the vehicle seat (during transfer between the use position and the not-in-use position by the drive device) the mating element from exiting from the mount. The catch secures the mating element in the mount so that it does not leave the mount until a limit force acting on the catch has been reached. It is exclusively the catch which can secure the mating element so that it does not leave the mount. The vehicle seat can be pivotable manually out of the use position into the not-in-use position, the mating element exiting from the mount in the process.

An energy store, in particular a spring, can prestress the catch in the direction of a position in which it secures the mating element in the mount (outside the self-locking region). By virtue of an actuating force being applied to the vehicle seat, in particular to the backrest, the catch can be subjected to an opening torque via the mating element, wherein the catch can be pivoted into a released position by the mating element as soon as the opening torque is greater than a closing torque exerted on the catch by the energy store.

BRIEF DESCRIPTION OF THE FIGURES

The invention will be explained in more detail hereinbelow with reference to the three advantageous exemplary embodiments which are illustrated in the figures. However, the invention is not restricted to these exemplary embodiments. In the figures.

DETAILED DESCRIPTION

Figure 1:
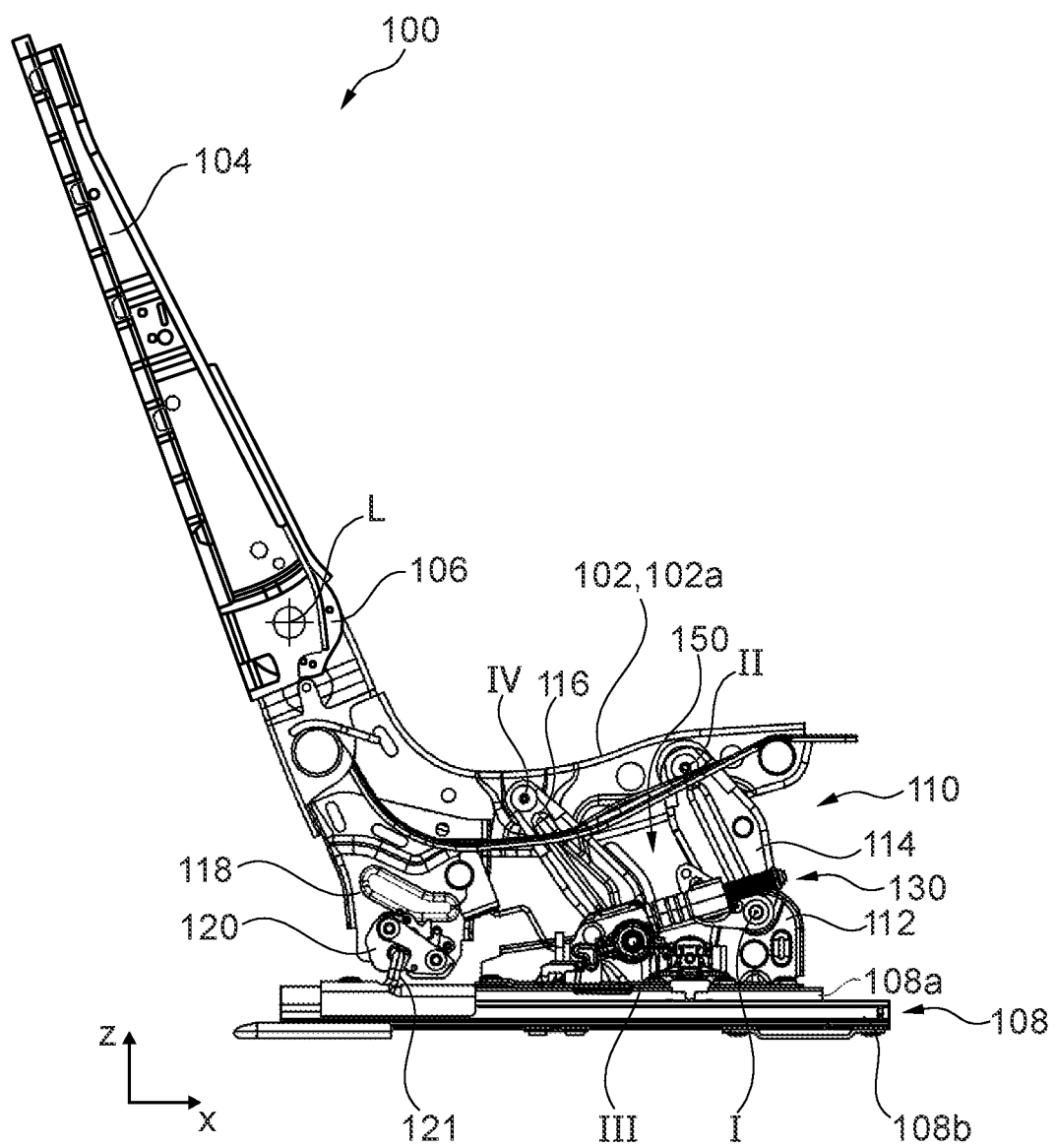
FIG. 1: shows a side view of a first exemplary embodiment of a vehicle seat according to the invention in a use position.
Figure 2:
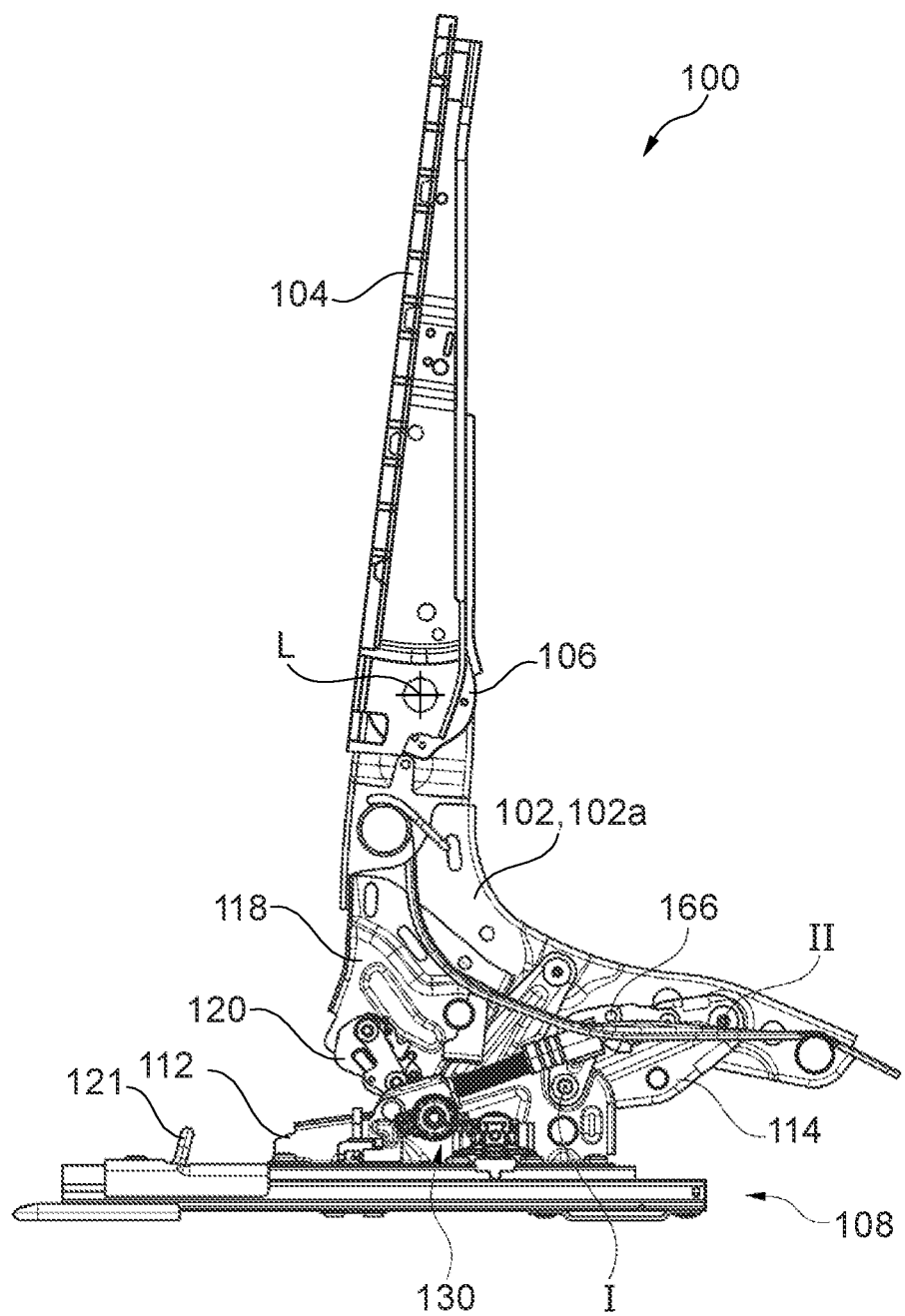
FIG. 2: shows a side view of the vehicle seat from FIG. 1 in an access position.

The invention will be described in more detail with reference to three exemplary embodiments of vehicle seats 100; 200; 300 according to the invention, wherein the three-digit reference signs beginning with the numeral 1 are assigned to the first exemplary embodiment, the three-digit reference signs beginning with the numeral 2 are assigned to the second exemplary embodiment, and the three-digit reference signs beginning with the numeral 3 are assigned to the third exemplary embodiment.

The vehicle seats 100; 200; 300 illustrated schematically in the figures will be described hereinbelow using three directions in space which run perpendicularly in relation to one another. For a vehicle seat 100; 200; 300 installed in the vehicle, a longitudinal direction x runs largely horizontally and preferably parallel to a longitudinal direction of the vehicle, which corresponds to the customary direction of travel of the vehicle. A transverse direction y, which runs perpendicularly in relation to the longitudinal direction x, is likewise oriented horizontally in the vehicle and runs parallel to a transverse direction of the vehicle. A vertical direction z runs perpendicularly in relation to the longitudinal direction x and perpendicularly in relation to the transverse direction y. For a vehicle seat 100; 200; 300 installed in the vehicle, the vertical direction z runs parallel to the vertical axis of the vehicle.

The information given in relation to position and direction, for example forward/front, rearward, upward and downward, relate to a viewing direction of a vehicle occupant sitting in the normal sitting position in the vehicle seat 100; 200; 300, wherein the vehicle seat 100; 200; 300 is installed in the vehicle in a use position suitable for transporting people, with the backrest 104; 304 upright, and oriented as normal in the direction of travel.

The vehicle seats 100; 200; 300, which are provided for example in the form of an outer seat of a central or rear row of seats in a motor vehicle, for example a van, each have a seat part 102; 202; 302 and a backrest 104; 304. The backrest 104; 304 can be adjusted in inclination about a backrest pivot axis L in each case by at least one fitting 106, in this present case two fittings 106, so that a number of use positions are defined. The term seat part 102; 202; 302 is intended to be understood as being the overall assembly, having a seat-part structure 102a; 202a; 302a and an upholstery cushion. If components are articulated on the seat part 102; 202; 302, these are understood as being articulated on the seat-part structure 102a; 202a; 302a of the seat part 102; 202; 302. The same applies to the backrest 104; 304.

For the sake of simplicity, it is always just one side of the essentially symmetrical vehicle seats 100; 200; 300 which will be described hereinbelow, that is to say, unless described to the contrary, in each case two of the components mentioned hereinbelow are present (possibly in mirror-symmetrical formation).

The vehicle seat 100 of the first exemplary embodiment will be described hereinbelow with reference to FIGS. 1 to 12.

FIG. 1 illustrates the vehicle seat 100 in a specific use position, that is to say a design position, in which the backrest 104 is inclined rearward by for example 23° in relation to the vertical.

A base of the vehicle seat 100 can be connected to the structure of the motor vehicle. The base here is designed in the form of a longitudinal adjuster 108, which makes it possible for the vehicle seat 100 to be adjusted longitudinally. The base here has a floor rail 108b, which can be connected directly to the vehicle structure, and a seat rail 108a, which is connected to the seat part 102 and can be displaced in the longitudinal direction x relative to the floor rail 108b. The two profiled rails 108a, 108b engage alternately one behind the other by way of their inwardly and outwardly angled longitudinal edges. The longitudinal adjuster 108 can preferably be displaced, in the manner known per se, by a spindle drive into any desired longitudinal-adjustment position within a predetermined adjustment region. As an alternative, it is possible to provide a longitudinal adjuster of which the rails 108a, 108b can be locked to one another by a rail-locking mechanism which is known per se, wherein the rail-locking mechanism can be unlocked manually by the occupant of the vehicle seat 1 using an unlocking clip which is known per se, and, when the rail-locking mechanism has been unlocked, the longitudinal-adjustment position can be altered manually by the vehicle occupant.

A front foot 112 is fitted on the base. In this present case, the front foot 112 is fixed to the seat rail 108a. As an alternative, it is also possible for the front foot 112 to be locked in a releasable manner to the seat rail 108a.

The seat part 102 is articulated in the region of a front end of the front foot 112 by a swing arm 114. The swing arm 114 has two ends. A rotary joint is provided in the region of each of these two ends. A first rotary joint I forms a means of articulating the swing arm 114 on the front foot 112. A second rotary joint II forms a means of articulating the swing arm 114 on the front end of the seat part 102. The swing arm 114 of the left-hand side of the vehicle seat can be connected to the swing arm 114 of the right-hand side of the vehicle seat via a transverse connection, in particular a transverse tube.

The seat part 102 is also articulated on the front foot 112 by a link 116, which is arranged behind the swing arm 114. The link 116 has two ends, a rotary joint being provided in the region of each of these two ends. A third rotary joint III forms a means of articulating the link 116 on the front foot 112. A fourth rotary joint IV forms a means of articulating the link 116 on the seat part 102. Precisely one such link 116 is correspondingly arranged on the two sides of the vehicle seat 100.

The front foot 112, the swing arm 114, the link 116 and the seat part 102 form a kinematics mechanism 110, in particular a four-joint mechanism. The vehicle seat 100 can be moved by the four-joint mechanism, along a predetermined movement path, from the use position into an axis position, which is illustrated in FIGS. 2, and back again.

On the base, in the present case on the seat rail 108a of the longitudinal adjuster 108, it is also the case that a rear foot 118, which is formed separately from the front foot 112, is arranged behind the front foot 112, as seen in the longitudinal direction x. The rear foot 118 of the left-hand side of the vehicle seat is connected to the rear foot 118 of the right-hand side of the vehicle seat via a transverse connection. The rear foot 118 can be locked in a releasable manner to the base, more precisely it can be locked to a base-mounted locking element 121, by a lock 120 fastened on the rear foot 118. In the present case, the locking element is fastened on the seat rail 108a. The rear foot 118 can therefore be connected indirectly to the vehicle structure. A locking element 121 is, for example, a bolt or a wire clip.

In a state in which it is blocked with the lock 120, the locking element 121 is centered in a slot-like receiving opening of the rear foot 118 or, as an alternative, of a housing of the lock 120 and is prevented from leaving the receiving opening by a rotary latch of the lock 120. In the use position of the vehicle seat 100, the receiving opening and the catch of the lock 120 fix the rear foot 118 relative to the base.

A drive device 130 and a coupling device 150 are arranged in the region of one of the two swing arms 114, for example in the region of the left-hand swing arm 114. For illustrative reasons, the coupling device 150 is not visible in FIGS. 1 and 2. The construction and function of the coupling device 150 will be described hereinbelow, in particular, with reference to FIGS. 4 to 12.

There is not necessarily more than one drive device 130 and one coupling device 150 provided, in which case they are not necessarily arranged symmetrically in relation to a central plane of the vehicle seat 100. Depending on the installation situation of the vehicle seat 100 in a vehicle, the drive device 130 and the coupling device 150 can be arranged optionally on the left-hand or right-hand side of the vehicle seat.

The vehicle seat 100 does not require any additional mechanical or electromechanical actuators in order for the locks 120 of the rear feet 118 to be unlocked before the vehicle seat 100 can be pivoted from a use position into an access position by the kinematics mechanism 110. The locks 120 are unlocked by interaction of the drive device 130 and the coupling device 150.

The drive device 130 has a motor 130a. The drive device 130 additionally has a transmission 130b, which is connected to the motor 130a, and a spindle 132. The spindle 132, which can be driven in rotation about a spindle axis S by the motor 130a, is arranged on the output side of the transmission 130b. The motor 130a is preferably retained in a counter-bearing relative to a front foot 112 on the base of the vehicle seat 1. By virtue of the spindle 132 rotating about the spindle axis S, a spindle nut 134, which is retained in a connecting member 136, can be moved along the spindle 132 in the axial direction of the spindle 132. The spindle nut 134 moves in translation along the spindle 132 when the spindle 132 rotates. The connecting member 136 is connected to the coupling device 150 in a pivotable manner, in particular by a connecting bolt.

The coupling device 150 has a coupling member 164. The coupling member 164 is mounted on the front foot such that it can be pivoted about a bearing bolt 180. The bearing bolt 180 is in alignment with the first rotary joint I. The coupling member 164 has a bolt 166. The bolt 166 is preferably welded to the coupling member 164.

In addition to the coupling member 164, the coupling device 150 also comprises a catch 162, which is designed in the form of a bracing catch and is mounted on a coupling device, designed in the form of a catch-support device 170, such that it can be pivoted about a bearing bolt 162a. The catch-support device 170 is fixed, preferably screwed, to the swing arm 114. For this purpose, the catch-support device 170 has two through-holes 170a for screws.

The catch-support device 170 has the catch 162, an unlocking swing arm 172 and a mount 174. The unlocking swing arm 172 has a control contour 172a and an interface 172b. One end of a Bowden cable 173 is fastened, preferably fitted, onto the interface 172b. The other end of the Bowden cable 173 is fastened on one of the locks 120 of the rear feet 118 such that pivoting of the unlocking swing arm 172 cause the locks 120 to be unlocked.

The mount 174 serves to receive the bolt 166 of the coupling member 164. The mount 174 is a slot, which is open at one end, in a support plate 176 of the catch-support device 170. The unlocking swing arm 172 is mounted in a pivotable manner on the support plate 176. The control contour 172a of the unlocking swing arm 172 crosses over the mount 174 such that displacement of the bolt 166 within the mount 174 in the direction of a closed end region 174a of the mount 174 causes the unlocking swing arm 172 to pivot out of an initial angular position into a moved-out angular position.

During the displacement of the bolt 166 within the mount 174 in the direction of a closed end region 174a, the control contour 172a of the unlocking swing arm 172 slides along the bolt 166 such that the unlocking swing arm 172 is pivoted and the locks 120 of the rear feet 118 are opened. By virtue of the mating element 166 moving within the mount 174 in the direction of the end region 174a of the mount 174, the mating element 166 pivots the control contour 172a of the unlocking swing arm 172 downward.

Until the catch 162 is subjected to a limit force defined by a spring 163, the catch 162 can lock the bolt 166 so that it does not exit from the mount 174. As in the exemplary embodiment described above, the catch 162 is a bracing catch.

In the use position of the vehicle seat 100, the bolt 166 is located, within the mount 174, at a distance from the end region 174a of the mount 174. Activation of the drive device 130 pivots the coupling member 164, as a result of which the bolt 166 moves first of all as far as the end region 174a of the mount 174 without pivoting the catch-support device 170. It is therefore the case that first of all the kinematics mechanism 110 remains unactuated, but pivoting of the unlocking swing arm 172 causes the lock 120 to be unlocked, the rear foot 118 therefore being released from the seat rail 108a. As the operation progresses, on account of its butting against the end region 174a, the bolt 166 carries the catch-support device 170 along, so that the swing arm 114 of the kinematics mechanism 110 is pivoted along and therefore the vehicle seat is transferred into the access position.

For the purpose of transferring the vehicle seat 100 out of the access position back again into the use position, the drive device 130, following an inoperative stretch, pivots the coupling member 164 in the corresponding direction. Following the inoperative stretch within the mount 174, the bolt 166 reaches the catch 162. As the operation progresses, the bolt 166 acts on the catch 162 such that the catch-support device 170 is carried along and, as a result, the swing arm 114 of the kinematics mechanism 110 pivots along, as a result of which the vehicle seat 100 is transferred into the use position. If the force which the bolt 166 exerts on the catch 162 exceeds a limit force, the catch 162—on account of being designed in the form of a bracing catch—opens.

The catch 162 is prestressed by the spring 163 in the direction of a position in which it locks with the bolt 166. The catch 162 is formed outside the self-locking region. Under loading, the bolt 166 exerts an opening torque on the catch 162. The force of the spring 163 counteracts this opening torque with locking action until the opening torque is greater than a counter-torque generated by the force of the spring 163. The opening torque can be achieved, in particular, by the backrest 102 being subjected to a force applied manually in the region of an upper edge of the backrest. If the torque exerted on the catch 162 by the bolt 166 exceeds the counter-torque, the catch opens and frees the bolt 166. In the open state of the catch 162, the coupling member 164 can be pivoted relative to the swing arm 114, so that the swing arm 114 can be pivoted independently of the coupling member 164. A manual transfer of the vehicle seat 100 into the access position, in particular for emergency exiting from a row of seats behind the vehicle seat 100, can therefore take place.

Figure 3:
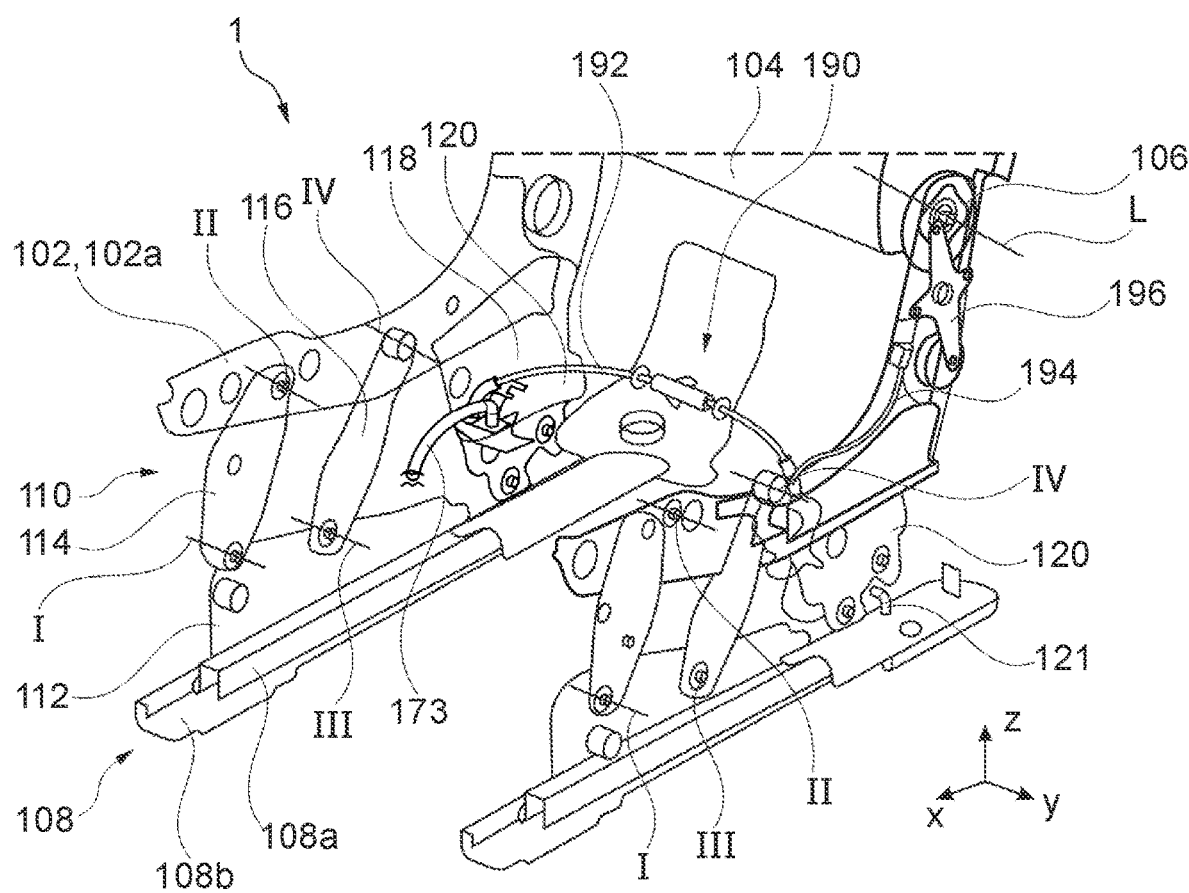
FIG. 3: shows, highly schematically and in detail form, a perspective view of the vehicle seat from FIG. 1, in particular of a Bowden-cable device for the synchronized unlocking of two locks by an operating lever for the purpose of ensuring an emergency exit.
Figure 4:
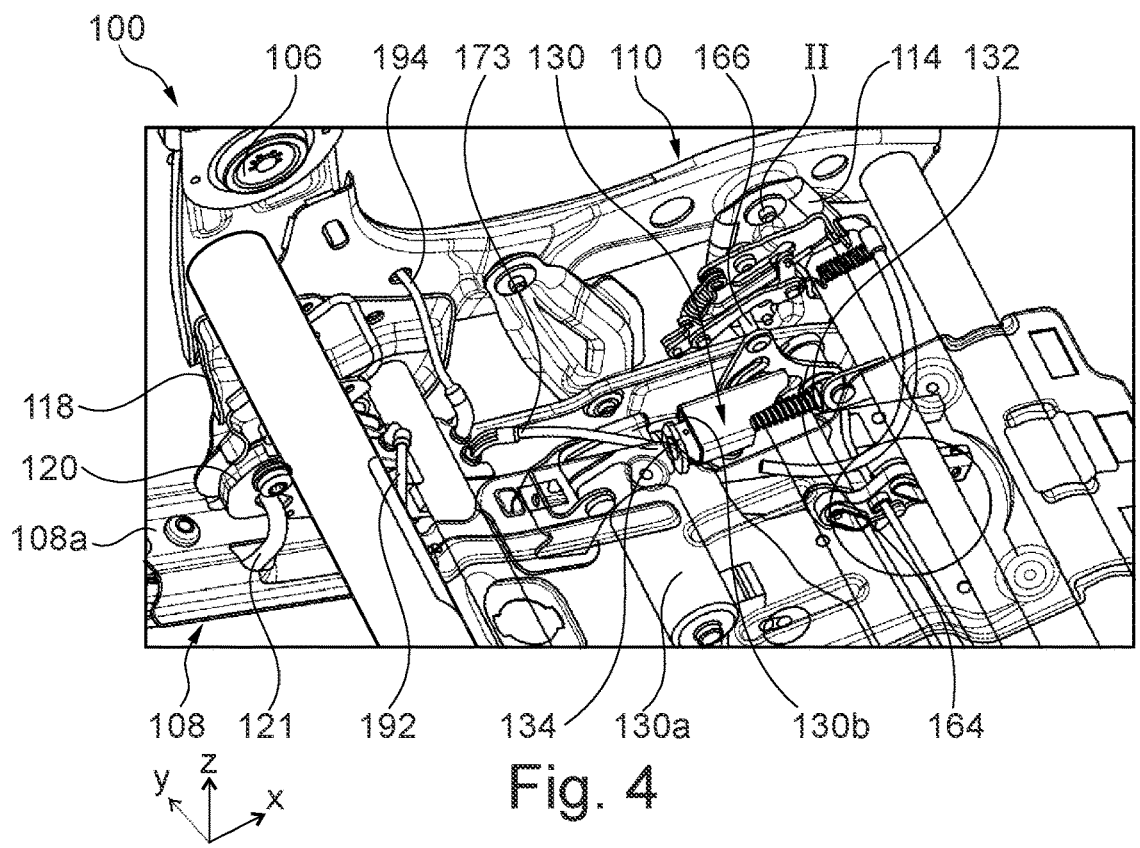
FIG. 4: shows, in detail form, a perspective view of the vehicle seat from FIG. 1 in the use position.
Figure 5:
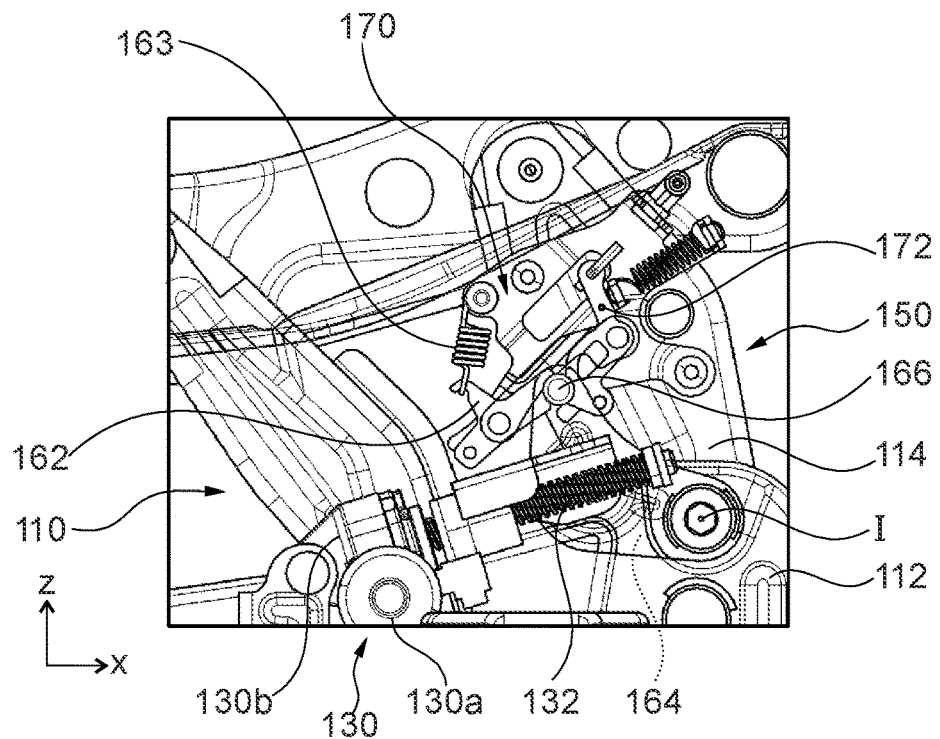
FIG. 5: shows, in detail form, a side view of the vehicle seat from FIG. 1 in the use position.
Figure 6:
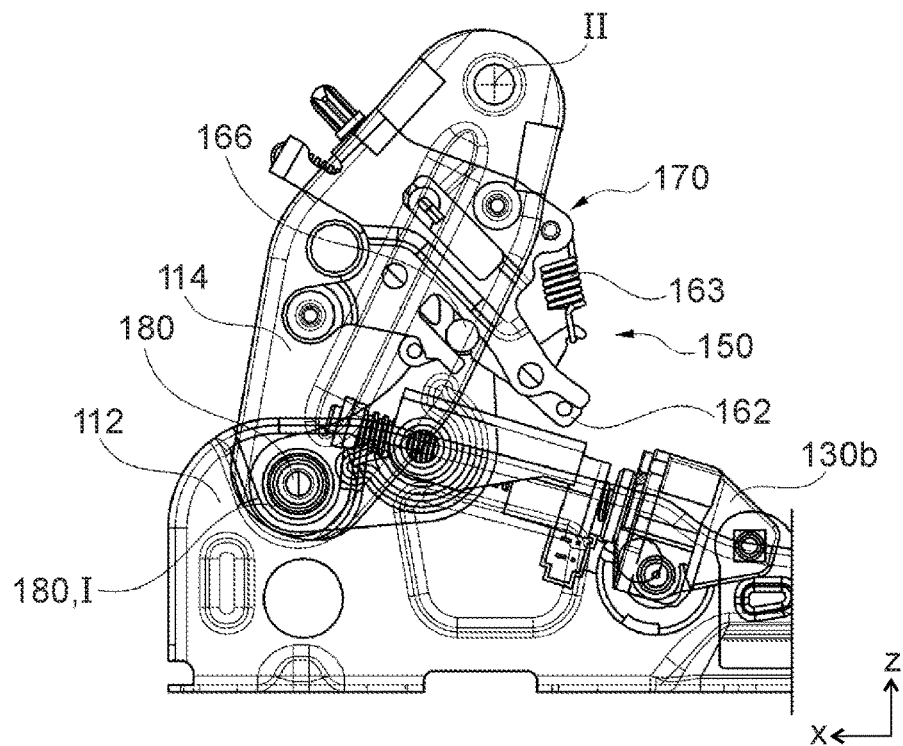
FIG. 6: shows, in detail form, a side view of the vehicle seat from FIG. 1 in the use position.
Figure 7:
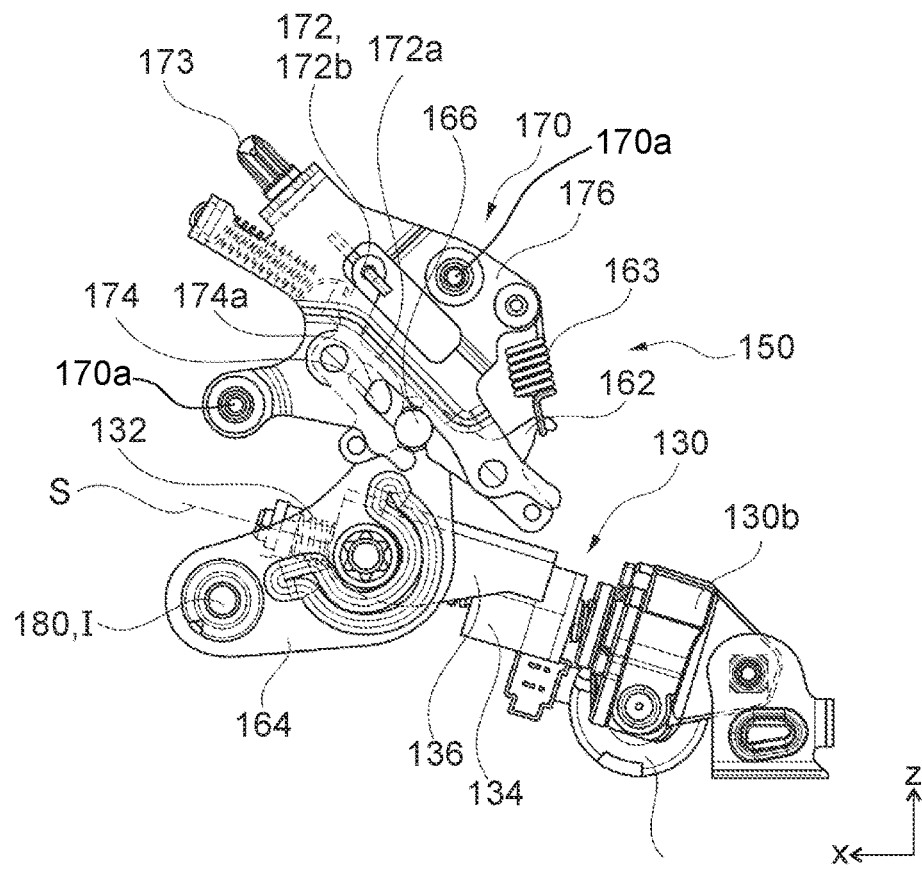
FIG. 7: shows, in detail form, a side view of a drive device and of a coupling device of the vehicle seat from FIG. 1 in the use position.
Figure 8:
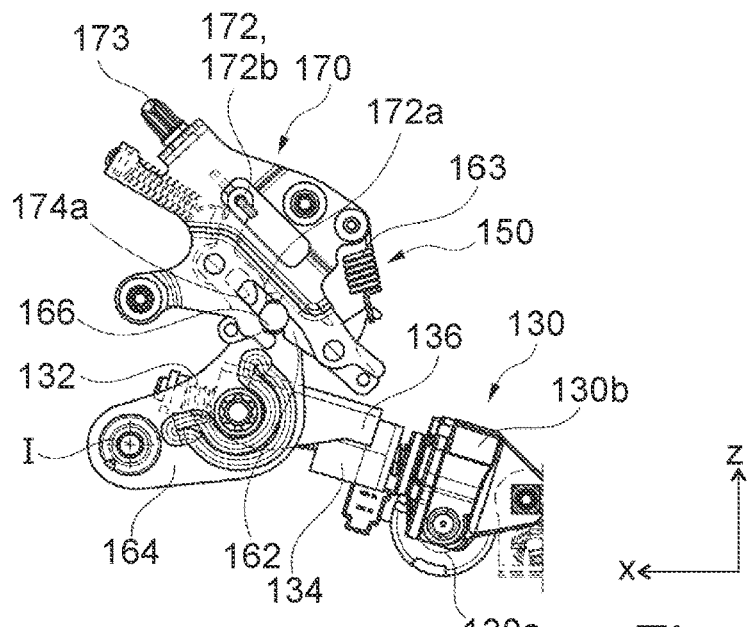
FIG. 8: shows, in detail form, the vehicle seat from FIG. 1 in the use position, an unlocking swing arm being illustrated in an initial angular position.
Figure 9:
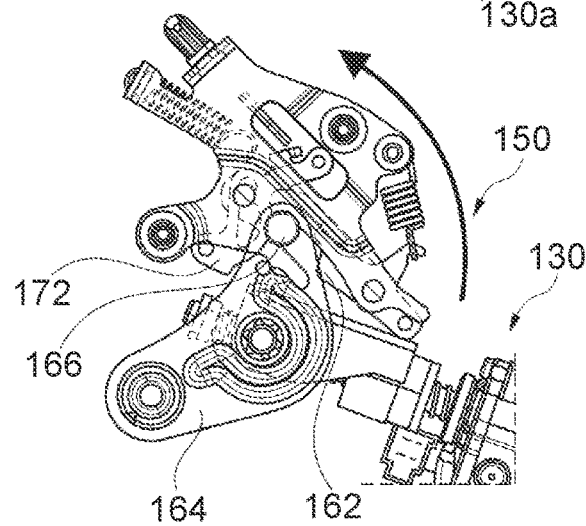
FIG. 9: shows, in detail form, the vehicle seat from FIG. 1 at the beginning of transfer into the access position, the unlocking swing arm being located in a moved-out angular position.
Figure 10:
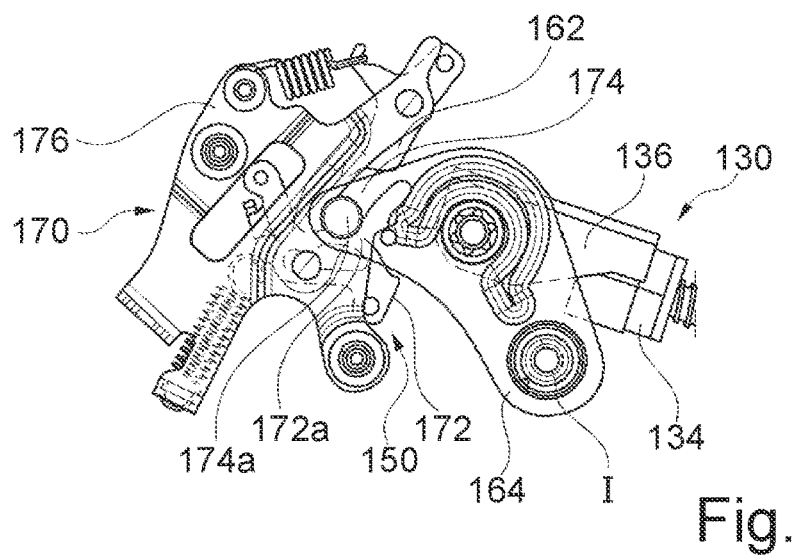
FIG. 10: shows, in detail form, the vehicle seat from FIG. 1 in the access position.
Figure 11:
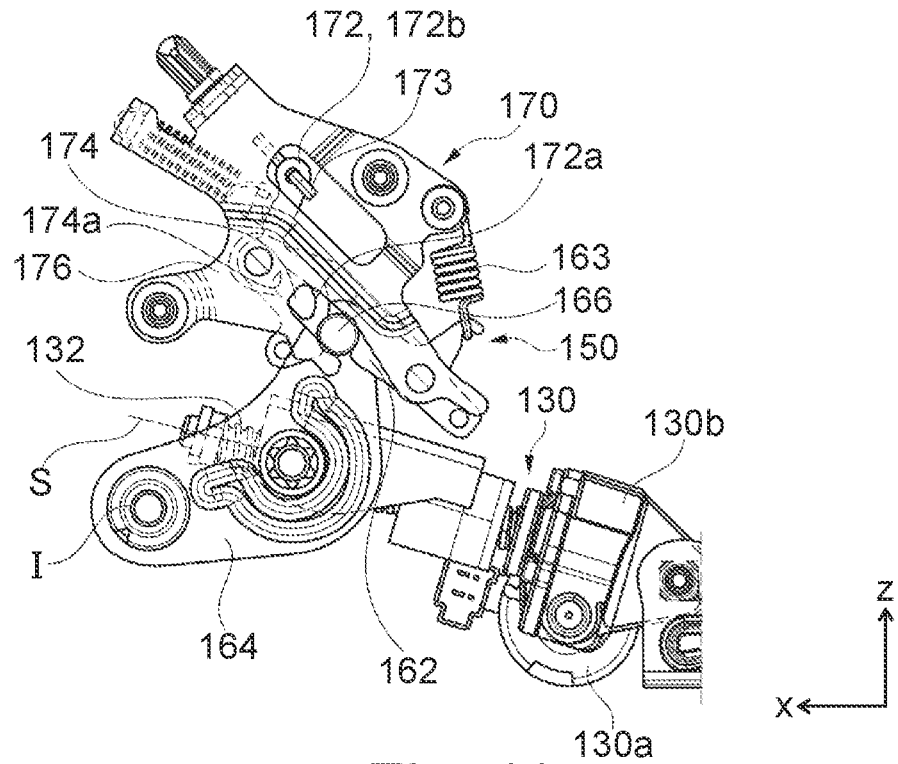
FIG. 11: shows an illustration corresponding to FIG. 8, a catch being located in a position in which a catch-support device is locked to a coupling member.
Figure 12:
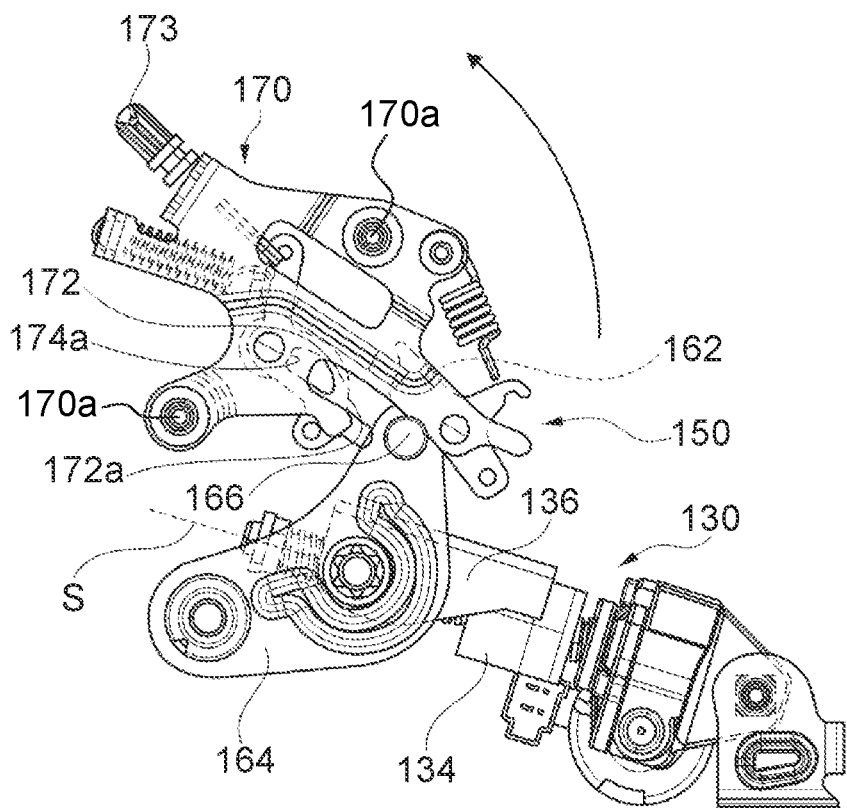
FIG. 12: shows, in detail form, the vehicle seat from FIG. 1 during manual transfer into the access position with the catch open.

FIG. 3 shows a Bowden-cable device 190 for the synchronized unlocking of the two locks 120 by an operating lever 196. For a manual transfer of the vehicle seat 100 into the access position, the locks 120 have to be unlocked before the catch 162 opens as a result of force being applied to the backrest 102.

The Bowden-cable device 190 comprises a first Bowden cable 192, a second Bowden cable 194 and an operating lever 196. The two locks 120 can be unlocked synchronously with one another by way of the first Bowden cable 192. The second Bowden cable 194 connects the operating lever 196 to one of the two locks 120. As a result of the operating lever 196 being actuated, the two locks 120 can be unlocked synchronously via the Bowden cables 192, 194. The Bowden-cable device 190 serves to provide an emergency exit by virtue of the locks 120 being manually unlockable. The abovedescribed electromechanical drive device 130 therefore need not be energized for emergency-exiting purposes.

In a modification of the exemplary embodiment that is not illustrated in the figures, for the manual unlocking of the two locks 120, the operating lever 196 is replaced by two pull loops, in particular made of a textile tape. A first pull loop is routed rearward and serves, in particular, for unlocking of the two locks 120 by a person who is sitting on a further row of seats arranged behind the vehicle seat 100. A second pull loop is routed forward and serves, in particular, for unlocking of the two locks 120 from the front by a person who is located next to, or in front of, the vehicle seat 100.

Figure 13:
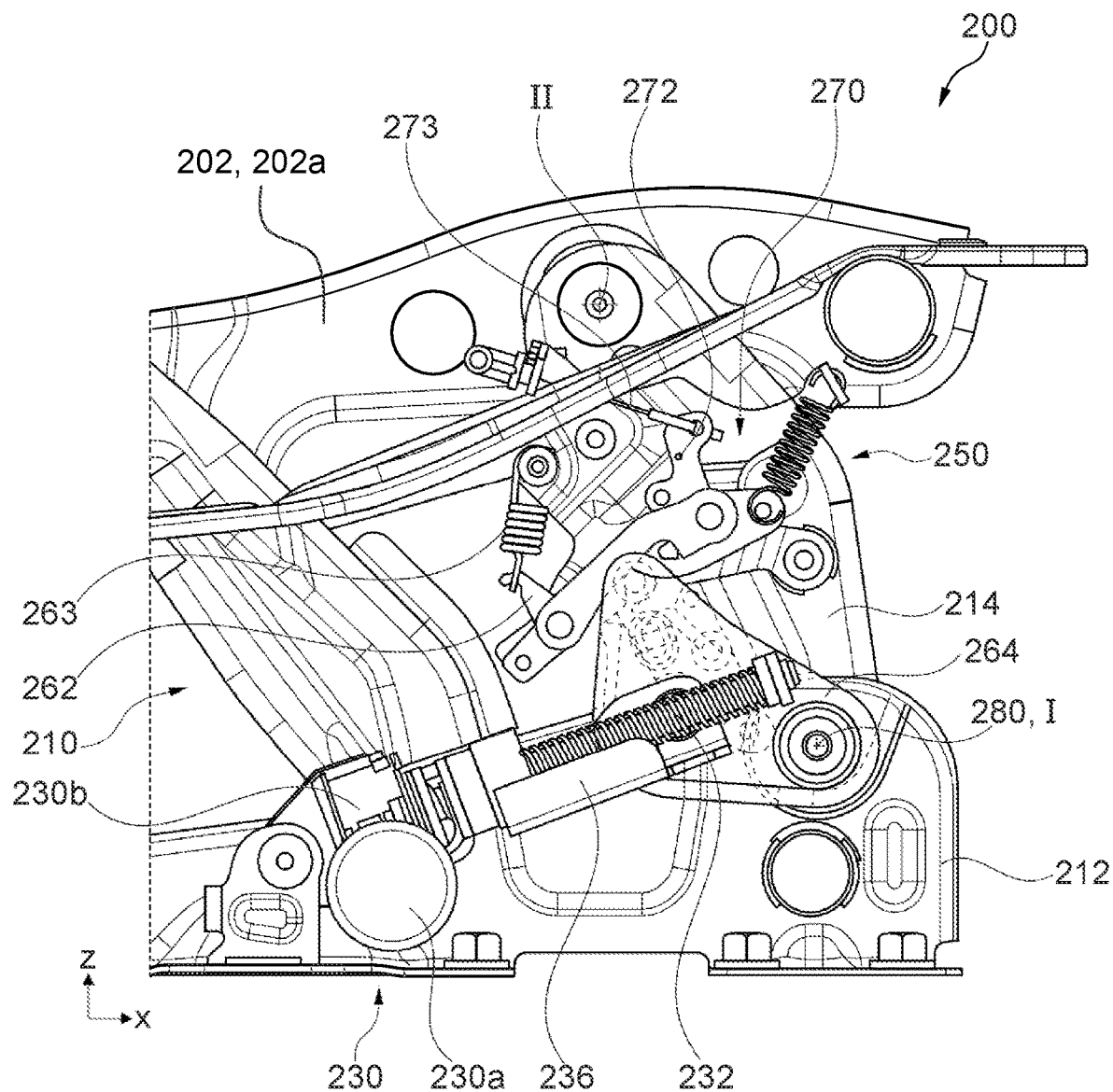
FIG. 13: shows, in detail form, a side view of a second exemplary embodiment of a vehicle seat according to the invention.
Figure 14:
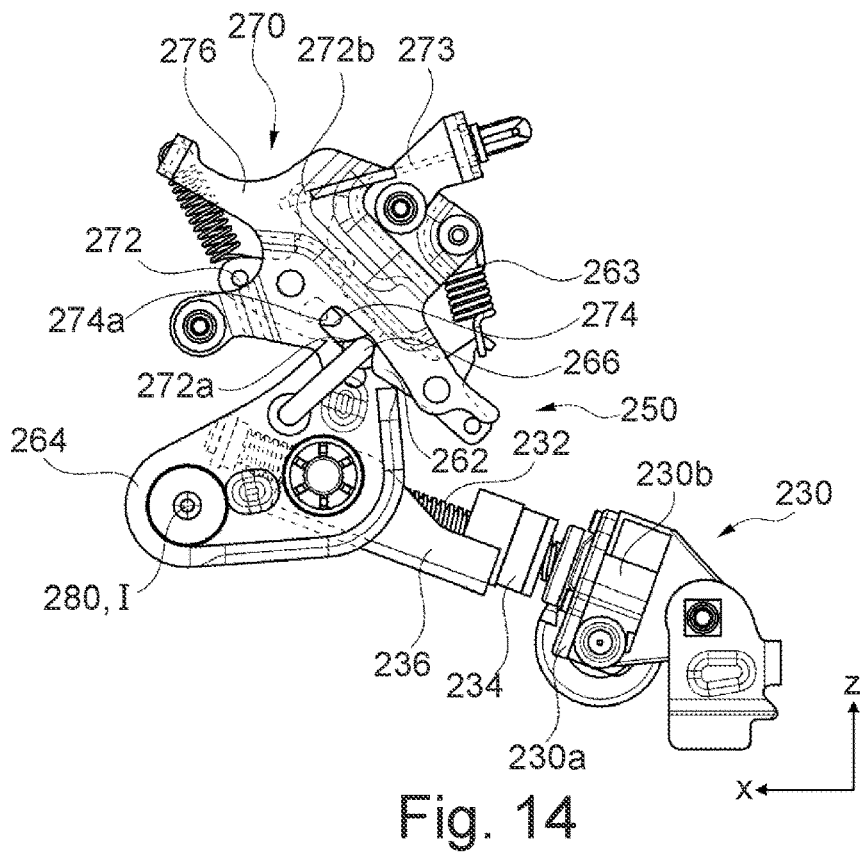
FIG. 14: shows, in detail form, a side view of the vehicle seat from FIG. 13 in a use position, an unlocking swing arm being illustrated in an initial angular position.
Figure 15:
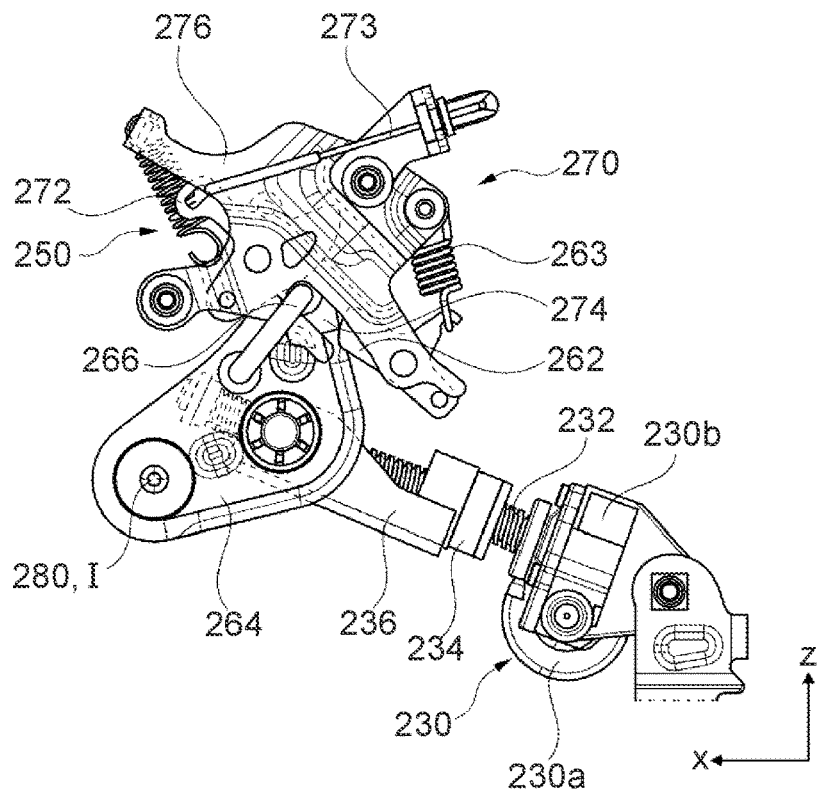
FIG. 15: shows, in detail form, a side view of the vehicle seat from FIG. 13 at the beginning of transfer into the access position, the unlocking swing arm being located in a moved-out angular position.
Figure 16:
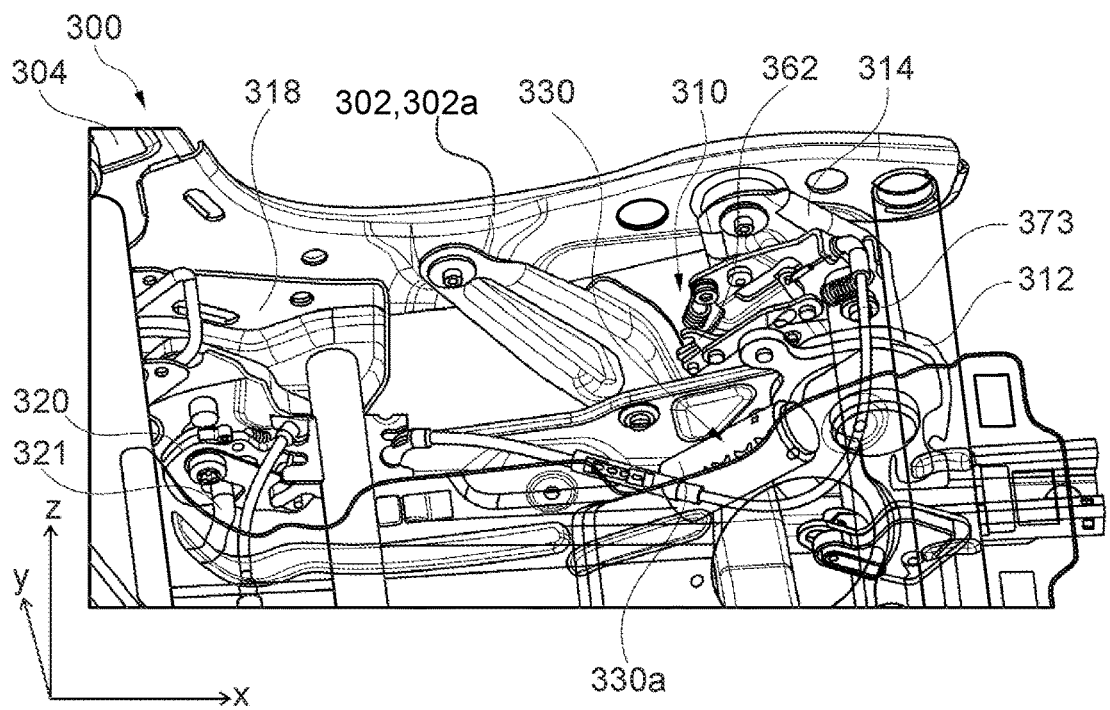
FIG. 16: shows, in detail form, a perspective view of a third exemplary embodiment of a vehicle seat in the use position.
Figure 17:
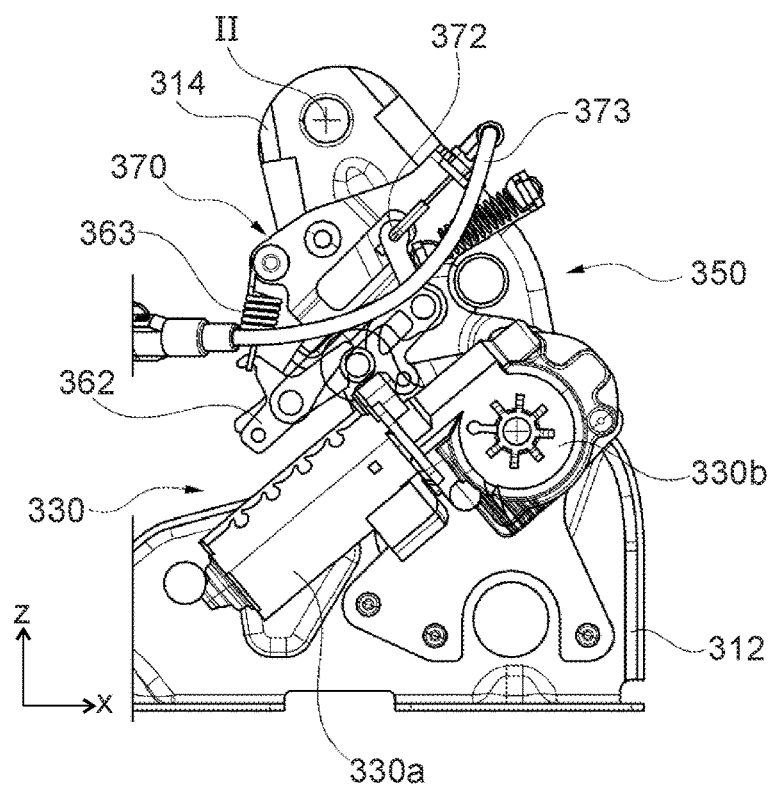
FIG. 17 shows, in detail form, a side view of the vehicle seat from FIG. 16 in the use position.
Figure 18:
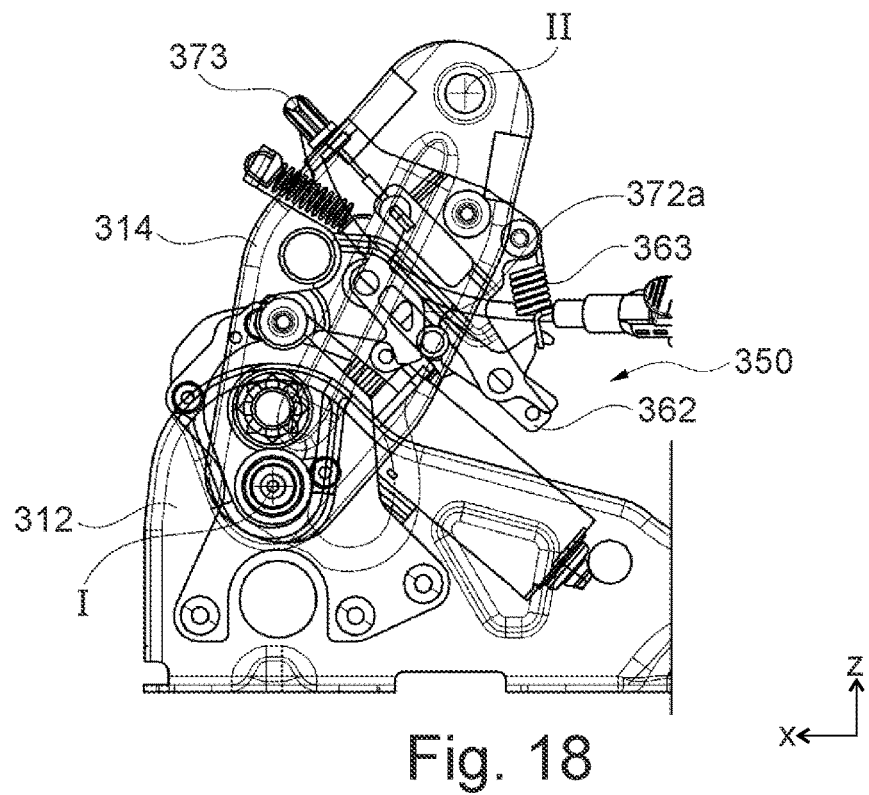
FIG. 18: shows, in detail form, a side view of the vehicle seat from FIG. 16 in the use position.
Figure 19:
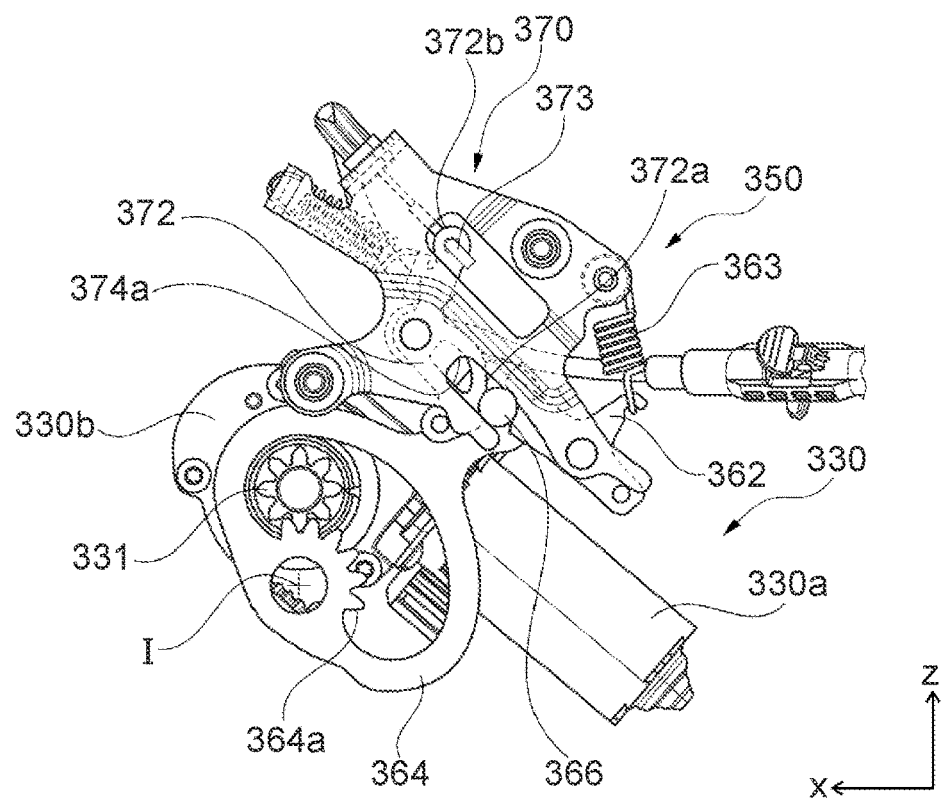
FIG. 19: shows, in detail form, a side view of a drive device and of a coupling device of the vehicle seat from FIG. 16 in the use position.
Figure 20:
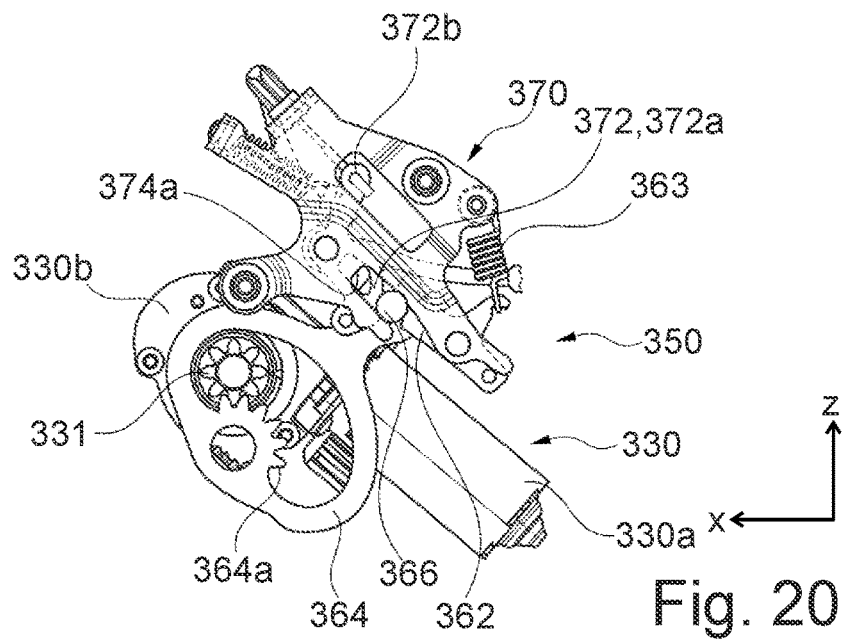
FIG. 20: shows, in detail form, the vehicle seat from FIG. 16 in the use position, an unlocking swing arm being illustrated in an initial angular position.
Figure 21:
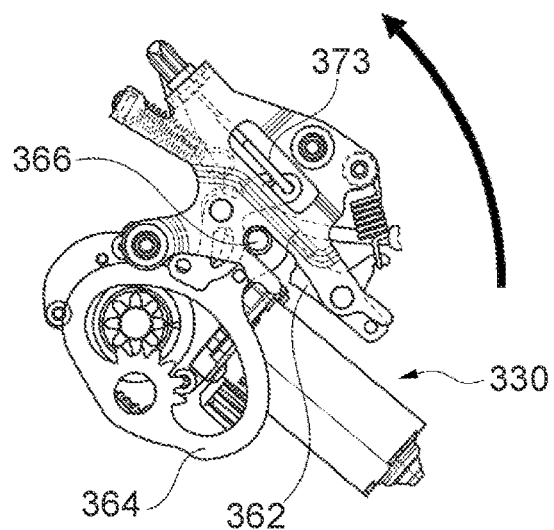
FIG. 21: shows, in a detail form, the vehicle seat from FIG. 16 at the beginning of transfer into the access position, the unlocking swing arm being located in a moved-out angular position.
Figure 22:
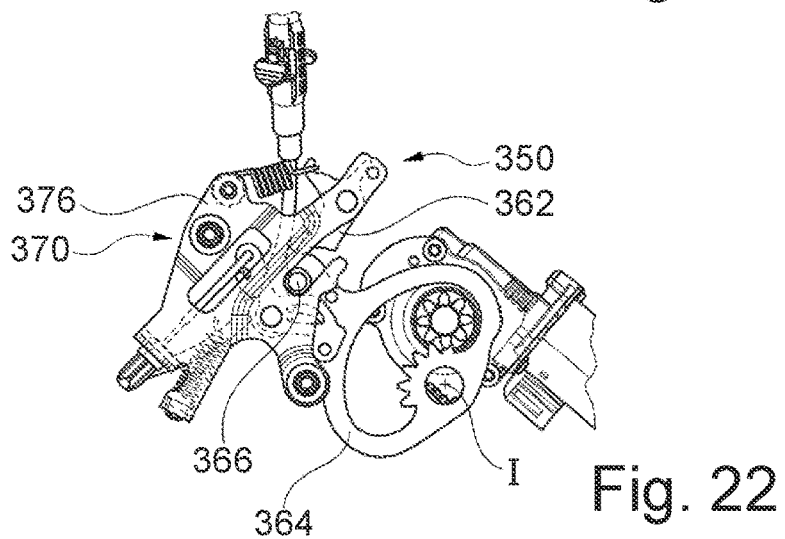
FIG. 22: shows, in detail form, the vehicle seat from FIG. 16 in the access position.
Figure 23:
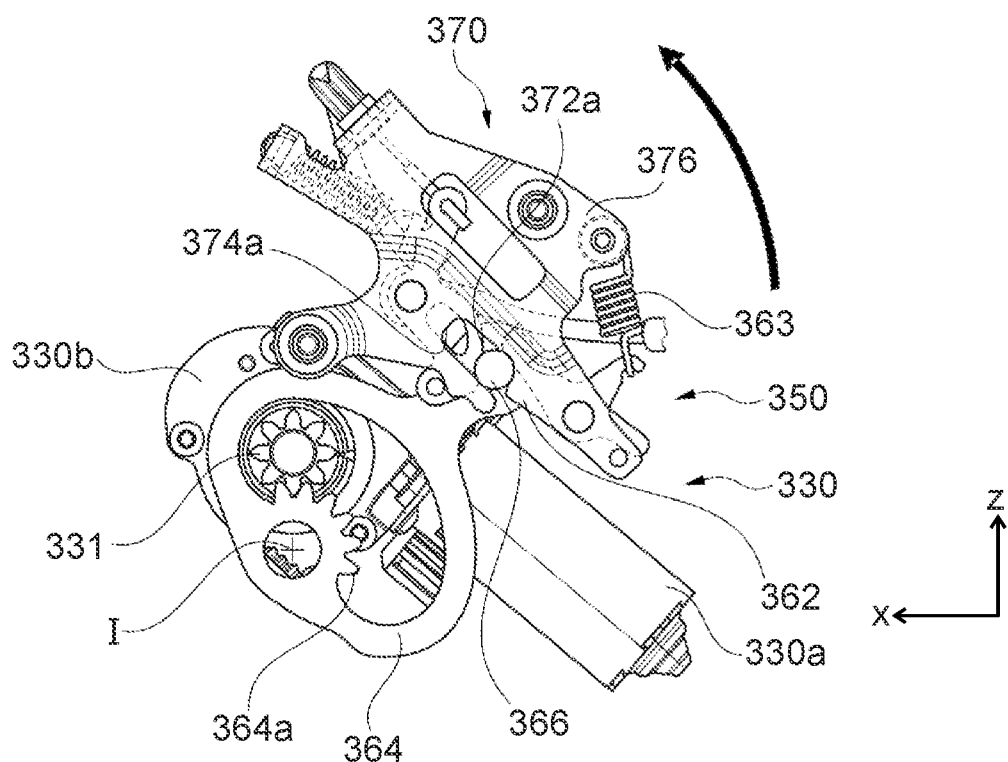
FIG. 23: shows an illustration corresponding to FIG. 20, a catch being located in a position in which a catch-support device is locked to a coupling member.
Figure 24:
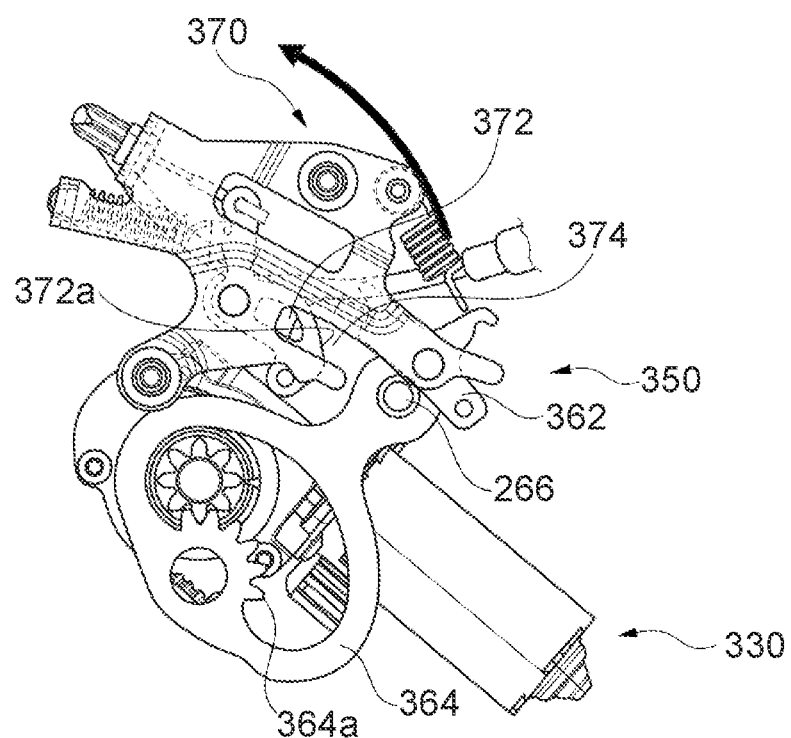
FIG. 24: shows, in detail form, the vehicle seat from FIG. 16 during manual transfer into the access position with the catch open.

FIGS. 13 to 15 describe a second exemplary embodiment of a vehicle seat 200 according to the invention, which—unless described to the contrary hereinbelow—corresponds to the abovedescribed vehicle seat 100. The same or equivalent components are denoted by reference signs increased by the value 100. Therefore, the vehicle seat of the second exemplary embodiment is denoted, for example, by the reference sign 200 (vehicle seat 200), which is increased by the value 100 in relation to the vehicle seat 100 of the first exemplary embodiment. If components of the second exemplary embodiment are not described hereinbelow, although they are illustrated in the figures, the description of the corresponding component of the first exemplary embodiment applies.

The vehicle seat 200 differs from the abovedescribed vehicle seat 100, in particular, by the unlocking swing arm 272 having an unlocking direction of rotation counter to that of the first exemplary embodiment. As a result, the Bowden cable 273 can be subjected to a tensile force which acts in the direction counter to that of the first exemplary embodiment. The altered unlocking direction of rotation is achieved by a correspondingly altered control contour 272*a*. Movement of the mating element 266 within the mount 274 in the direction of the end region 274*a* of the mount 274 causes the mating element 266 to pivot the control contour 272*a* of the unlocking swing arm 272 upward.

The mating element 266 for interacting with the unlocking swing arm 272 and the catch 262 is designed, in the second exemplary embodiment, in the form of a clip.

FIGS. 16 to 24 describe a third exemplary embodiment of a vehicle seat 300 according to the invention, which—unless described to the contrary hereinbelow—corresponds to the abovedescribed vehicle seat 100. The same or equivalent components are denoted by reference signs increased by the value 200. Therefore, the vehicle seat of the third exemplary embodiment is denoted, for example, by the reference sign 300 (vehicle seat 300), which is increased by the value 200 in relation to the vehicle seat 100 of the first exemplary embodiment. If components of the third exemplary embodiment are not described hereinbelow, although they are illustrated in the figures, the description of the corresponding component of the first exemplary embodiment applies.

The vehicle seat 300 differs from the abovedescribed vehicle seat 100, in particular, by a differently designed drive device 330 and also a differently designed coupling member 364.

The drive device 330 has a motor 330*a*. The drive device 330 additionally has a transmission 330*b*, which is connected to the motor 330*a*. The transmission 330*b* has a pinion 331 on the output side. Such a drive device 330 is known, for example, from DE 197 09 852 C2.

The coupling member 364 has a toothing segment 364*a*, which is in toothing engagement with the pinion 331. Rotation of the pinion 331 causes the coupling member 364 to pivot about the axis of rotation defined by the first rotary joint.

Otherwise, the construction and the functioning of the vehicle seat 300 correspond to the abovedescribed vehicle seat 100 of the first exemplary embodiment.

LIST OF REFERENCE SIGNS

100; 200; 300 vehicle seat
102; 202; 302 seat part
102*a*; 202*a*; 302*a* seat-part structure
104; 304 backrest
106 fitting
108 longitudinal adjuster
108*a* seat rail
108*b* floor rail
110; 210; 310 kinematics mechanism
112; 212; 312 front foot
114; 214; 314 swing arm
116 link
118; 318 rear foot
120; 320 lock
121; 321 locking element
130; 230; 330 drive device
331 pinion
130*a*; 230*a*; 330*a* motor
130*b*; 230*b*; 330*b* transmission
132; 232; 332 spindle
134;234; 334 spindle nut
136; 236; 336 connecting member
150; 250; 350 coupling device
162; 262; 362 catch
163; 263; 363 spring
164; 264; 364 coupling member
364*a* toothing segment
166; 266; 366 mating element, bolt, clip
170; 270; 370 coupling means, catch-support device
172; 272; 372 unlocking swing arm
172*a*; 272*a*; 372*a* control contour
172*b*; 272*b*; 372*b* interface
173; 273; 373 Bowden cable
174; 274; 374 mount
174*a*; 274*a*; 374*a* end region
176; 276; 376 support plate
180; 280; 380 bearing bolt
190 Bowden-cable device
192 first Bowden cable
194 second Bowden cable
196 operating lever
I first rotary joint
II second rotary joint
III third rotary joint
IV fourth rotary joint L pivot axis of the backrest
S spindle axis
x longitudinal direction
y transverse direction
z vertical direction

What is claimed is:

1. A vehicle seat, comprising: a seat part, a backrest, a kinematics mechanism for transferring the vehicle seat from a use position, in which the vehicle seat is suitable for transporting people, into a not-in-use position, and back again, and having a locking device, for locking the kinematics mechanism in the use position, wherein, when the locking device has been unlocked, the vehicle seat can be transferred out of the use position into an access position, wherein the kinematics mechanism, for transferring the vehicle seat out of the use position into the not-in-use position, can be coupled to a drive device by a coupling device, wherein the coupling device has an unlocking swing arm for at least indirectly unlocking the locking device, and wherein, in the use position of the vehicle seat, activation of the drive device first of all causes the unlocking swing arm to pivot, so that the locking device is unlocked, and it is only following the pivoting movement of the unlocking swing arm that the kinematics mechanism can be driven by the drive device for the purpose of transferring the vehicle seat into the not-in-use position.

2. The vehicle seat as claimed in claim 1, wherein the coupling device has a coupling member, which can be driven by the drive device, a coupling device, connected to the swing arm of the kinematics mechanism, and a catch for locking the coupling member to the coupling device in at least one direction.

3. The vehicle seat as claimed in claim 2, wherein the coupling device is in the form of a catch-support device, on which the catch is mounted in a pivotable manner.

4. The vehicle seat as claimed in claim 2, wherein the unlocking swing arm is mounted in a pivotable manner on the coupling device.

5. The vehicle seat as claimed in claim 2, wherein the coupling device has a mount for receiving a mating element of the coupling member.

6. The vehicle seat as claimed in claim 5, wherein the unlocking swing arm crosses over the mount, and the unlocking swing arm can be pivoted by a movement of the mating element within the mount.

7. The vehicle seat as claimed in claim 5, wherein the mount has an end region, wherein, for the purpose of transferring the vehicle seat out of the use position into the access position, once the locking device has been unlocked, the drive device pivots the mating element toward the end region and, as the operation progresses, the mating element drives the coupling device and therefore the kinematics mechanism.

8. The vehicle seat as claimed in claim 2, wherein the catch is in the form of a bracing catch.

9. The vehicle seat as claimed in claim 5, wherein, at least in the use position of the vehicle seat, the mating element is arranged within the mount, between the unlocking swing arm and the catch.

10. The vehicle seat as claimed in claim 5, wherein the catch secures the mating element in the mount until a limit force acting on the catch has been reached.

11. The vehicle seat as claimed in claim 5, wherein it is exclusively the catch which can secure the mating element so that it does not leave the mount.

12. The vehicle seat as claimed in claim 5, wherein an energy store prestresses the catch in the direction of a position that secures the mating element in the mount outside the self-locking region.

13. The vehicle seat as claimed in claim 5, wherein an actuating force is applied to the backrest, the catch can be subjected to an opening torque via the mating element, wherein the catch can be pivoted into a released position by the mating element when the opening torque is greater than a closing torque exerted on the catch by the energy store.

14. The vehicle seat as claimed in claim 13, wherein in the released position of the catch, the vehicle seat can be pivoted manually out of the use position into the not-in-use position, wherein the mating element exits from the mount.

15. The vehicle seat as claimed in claim 5, wherein the mating element comprises a bolt or a clip.

16. The vehicle seat as claimed in claim 12 wherein the energy store comprises a spring.

* * * * *